UNITED STATES PATENT OFFICE 1,998,626

PRODUCTION OF CATALYSTS CONTAINING MOLYBDENUM AND TUNGSTEN

Josef Koenig, Uerdingen-on-the-Rhine, Germany, assignor to I. G. Farbenindustrie Aktiengesellschaft, Frankfort-on-the-Main, Germany No Drawing. Application August 24, 1932, Serial No. 630,249. In Germany September 3, 1931

11 Claims. (Cl. 23—236)

The present invention relates to the production of catalysts containing molybdenum and tungsten.

It is already known that metallic molybdenum and tungsten or their compounds are very suitable as catalysts for certain catalytic reactions, as for example for the synthesis of ammonia or the destructive hydrogenation of carbonaceous materials, by reason of their good catalytic activity, their long working life, and their stability to poisoning by sulphur. The preparation of such catalysts in a form in which they meet all requirements both as regards catalytic activity and high mechanical resistance, however, offers considerable difficulty.

I have now found that excellent catalysts containing molybdenum and tungsten, which have extremely good properties as regards strength are obtained by heating compounds of molybdenum or tungsten which volatilize when heated under atmospheric pressure to a temperature up to the sintering point, especially those containing oxygen, in a closed system under pressure, preferably above 10 atmospheres, either alone or in admixture with other substances, preferably catalytically active substances, at least to such a high temperature that they commence to sinter. By the term "volatilize" we understand for the purpose of the present invention also decomposition of the initial compounds accompanied by the escape of a gaseous product, as for example the decomposition of molybdic acid or tungstic acid with the formation of lower oxides and free oxygen. After cooling from coarsely to finely crystalline, very hard masses are obtained which if desired may be subjected to an aftertreatment, as for example a subsequent conversion with gases, such as, in the case of oxides, with hydrogen sulphide, or to a treatment with solvents dissolving part of the catalytic substance, such as, in the case of mixtures of molybdenum oxide and zinc powder, with a mineral acid. Compounds containing oxygen, such as molybdic and tungstic acids (having the formulae $MoO_3$ and $WO_3$ respectively) or other higher oxides or hydroxides of these metals, or decomposable or volatile molybdates and tungstates such as ammonium molybdate and ammonium tungstate are especially suitable as initial materials. Compounds of the said two metals which are free from oxygen, as for example alkali metal molybdenum cyanides, sulphides and the like may also be employed. The said substances may be employed either alone or in admixture with each other or with additions, in particular of other solid inorganic substances especially those of a catalytic or activating nature. Mixtures with metals, as for example zinc, aluminium, magnesium, chromium and the like, preferably in the form of powder, or with oxides or salts of these metals, and mixtures with metalloids, such as silicon, boron, sulphur or selenium are especially suitable.

The process according to this invention may be carried out by heating to the sintering or fusion temperature the said compounds or mixtures in a closed chamber, as for example a chamber having external electrical heating which is surrounded with a jacket of pressure-bearing material.

The necessary temperature depends on the nature of the material employed. With molybdic acid for example a temperature of at least 800° C., preferably about 900° C. is necessary whereby fusion takes place with partial decomposition of the acid. With tungstic acid a temperature of about 1500° C. is necessary. In the presence of metals, as for example zinc or aluminium, the formation of complex compounds of molybdic or tungstic acid with the oxides of the metals formed may take place. In some cases, as for example if the initial compounds are readily volatilized below the melting point, the maintenance of a great pressure during the heating is preferable. An increase in pressure may be produced directly by the splitting off of oxygen for example; in many cases it is preferable, however, to produce the increased pressure by pressing in or leading through an inert gas or a gas which reacts chemically with the catalyst.

The activity of the catalytic masses may if desired be increased by treatment with gases, as for example hydrogen, ammonia or hydrogen sulphide, or with solvents or other liquids, such as acids and the like.

In some cases it is preferable to apply the catalytic masses to carrier substances, as for example pumice stone, porous gels of alumina, iron oxide, silica, active carbon, chamotte grains and the like. This may be effected for example by heating the carrier substances in admixture with the initial materials to be treated, whereby the latter either coat the surface of the carrier or penetrate into the pores as a fused mass during the heating. The catalytically active compounds may also be precipitated or produced within the pores of the carrier substances before the heating.

For special purposes, as for example for the preparation of very dilute catalysts, the finished highly active catalysts may be ground together with carrier substances and if desired moulded with binding agents.

The catalysts prepared as such or on carriers may also serve as catalytically active carriers for other catalysts and in this case may be coated with other catalytically active metals or compounds.

The following examples will further illustrate the nature of this invention but the invention is not restricted to these examples. The parts are by weight.

Example 1

100 parts of molybdic acid are introduced into a metal cylinder provided with ceramic insertions and which has an insulated electrical heating winding externally. The metal cylinder is surrounded by a jacket of pressure-tight material which is capable of being closed. Equalization of pressure between the heating and reaction chambers is effected by means of an opening in the cylinder. After nitrogen has been pressed into the chamber until the pressure is 30 atmospheres, it is heated to about 900° C. whereby the molybdic acid melts with the splitting off of oxygen. The pressure rises to about 80 atmospheres. After cooling, a hard, dark-colored, crystalline mass is obtained which is comminuted to the desired grain size. The mass may be converted into a particularly hard metallic molybdenum having the same structure by treatment with hydrogen at elevated temperatures, or wholly or partly into molybdenum sulphide by treatment with gases containing hydrogen sulphide.

Example 2

100 parts of a molybdic acid which has been preheated for a short time at 400° C. are mixed with 20 parts of zinc powder and 2 parts of selenium, the whole then being heated to 900° C. in an autoclave a pressure of 30 atmospheres thereby being set up. The product obtained after cooling is a hard, brown violet, very finely-crystalline mass, which is distinguished by execellent catalytic activity in the splitting and hydrogenation of oils and the like.

Example 3

A mixture consisting of 100 parts of strongly dried molybdic acid and 20 parts of tungstic acid is heated to about 1000° C. under a pressure of nitrogen of 50 atmospheres in the chamber described in Example 1.

After cooling, a product is obtained which is a hard, blackish, crystalline mass having a high catalytic activity.

Example 4

Vitreous, highly porous alumina gel in the form of grains is impregnated with a concentrated solution of ammonium molybdate and then treated with hydrochloric acid gas whereby molybdic acid is deposited within the pores. After washing for a short time, the pretreated material is heated in the apparatus hereinbefore described to 900° C. After cooling a catalyst is obtained which consists of a hard carrier material within the pores of which lower oxides of molydenum are deposited in a particularly catalytically active form.

Example 5

Potassium molybdenum cyanide is heated for one hour to 1000° C. in a ceramic crucible placed in an apparatus as described in Example 1, while maintaining a pressure of 10 atmospheres by means of nitrogen. After cooling a greyish black melt of great hardness is obtained which may satisfactorily be used in the destructive hydrogenation of carbonaceous materials.

Example 6

Tungstic acid is heated to 1500° C., while maintaining a pressure of 10 atmospheres by means of nitrogen, in a crucible constructed of a highly refractory mass placed in the before-described apparatus in which the electrical heating windings consist of platinum. The tungstic acid is thus decomposed to form a hard, dark grey product of finely crystalline structure, which has favorable catalytic activity in splitting and hydrogenating reactions.

What I claim is:—

1. A process for the preparation of a valuable catalyst which comprises heating a compound of a metal selected from the class consisting of molybdenum and tungsten, which compound under atmospheric pressure volatilizes at a temperature up to the sintering point, under a pressure above 10 atmospheres at least to a temperature at which it begins to sinter.

2. A process for the preparation of a valuable catallyst which comprises heating molybdic acid under an elevated pressure above 10 atmospheres at least to a temperature of 800° C.

3. A process for the preparation of a valuable catalyst which comprises heating molybdic acid under an elevated presure above 10 atmospheres to about 900°.

4. A process for the preparation of a valuable catalyst which comprises heating tungstic acid under an elevated pressure above 10 atmospheres at least to a temperature of 1500° C.

5. A process for the preparation of a valuable catalyst which comprises heating a compound of a metal selected from the class consisting of molybdenum and tungsten, which compound under atmospheric pressure volatilizes at a temperature up to the sintering point, together with another solid inorganic substance under a pressure above 10 atmospheres at least to a temperature at which said compound begins to sinter.

6. A process for the preparation of a valuable catalyst which comprises heating a compound of a metal selected from the class consisting of molybdenum and tungsten, which compound under atmospheric pressure volatilizes at a temperature up to the sintering point, together with a material selected from the group consisting of zinc, aluminium, magnesium, chromium and the oxides and salts of these metals, under a pressure above 10 atmospheres at least to a temperature at which said compound begins to sinter.

7. A process for the preparation of a valuable catalyst which comprises heating a compound of a metal selected from the class consisting of molybdenum and tungsten, which compound under atmospheric pressure volatilizes at a temperature up to the sintering point, together with a metalloid selected from the group consisting of silicon, boron, sulphur and selenium, under a pressure above 10 atmospheres at least to a temperature at which said compound begins to sinter.

8. A process for the preparation of a valuable catalyst which comprises heating a compound of a metal selected from the class consisting of molybdenum and tungsten, which compound under atmospheric pressure volatilizes at a temperature up to the sintering point, in a closed chamber and under a pressure above 10 atmospheres at least to a temperature at which it begins to sinter.

9. A process for the preparation of a valuable catalyst which comprises heating a compound of a metal selected from the class consisting of molybdenum and tungsten, which compound under atmospheric pressure volatilizes at a temperature up to the sintering point, together with another solid inorganic substance in a closed chamber and under a pressure above 10 atmospheres at least to a temperature at which it begins to sinter.

10. A process for the preparation of a valuable catalyst which comprises heating a compound, containing oxygen, of a metal selected from the class consisting of molybdenum and tungsten, which compound under atmospheric pressure volatilizes at a temperature up to the sintering point, in a closed chamber and under a pressure above 10 atmospheres at least to a temperature at which it begins to sinter.

11. A process for the preparation of a valuable catalyst which comprises heating a compound, containing oxygen, of a metal selected from the class consisting of molybdenum and tungsten which compound under atmospheric pressure volatilizes at a temperature up to the sintering point, under a pressure above 10 atmospheres at least to a temperature at which it begins to sinter.

JOSEF KOENIG.